United States Patent [19]

Arao

[11] 4,453,170
[45] Jun. 5, 1984

[54] IMAGE FORMING APPARATUS WITH VIBRATION COMPENSATION

[75] Inventor: Kozo Arao, Yokohama, Japan

[73] Assignee: Canon Kabushiki Kaisha, Tokyo, Japan

[21] Appl. No.: 335,461

[22] Filed: Dec. 29, 1981

[30] Foreign Application Priority Data

Jan. 7, 1981 [JP] Japan .................................. 56-1335

[51] Int. Cl.³ .......................................... G01D 15/06
[52] U.S. Cl. ................................................. 346/160
[58] Field of Search ................. 346/108, 160; 358/300

[56] References Cited

U.S. PATENT DOCUMENTS 4,270,131 5/1981 Tompkins et al. .................. 346/108
4,307,409 12/1981 Greenig et al. ..................... 346/108

Primary Examiner—Thomas H. Tarcza
Attorney, Agent, or Firm—Fitzpatrick, Cella, Harper & Scinto

[57] ABSTRACT

In an image forming apparatus for recording information by scanning a movable photosensitive member with a light beam, the vibration of determined parts such as optical elements or photosensitive member is detected to activate a vibration forming device acting on said parts, thereby reducing fluctuation in the scanning pitch of the light beam on the photosensitive member in its moving direction.

10 Claims, 16 Drawing Figures

IMAGE FORMING APPARATUS WITH VIBRATION COMPENSATION

BACKGROUND OF THE INVENTION

1. Field of the Invention

The present invention relates to an image forming apparatus for forming an image corresponding to information to be recorded by scanning a photosensitive member with a light beam.

2. Description of the Prior Art

For the purpose of obtaining a visible image from computer output signals or electrical signals from image information output means, there is already known an image forming apparatus in which an electrophotographic photosensitive member is scanned with a laser beam modulated corresponding to the information to be recorded. In such apparatus, the laser beam scans said photosensitive member in a direction perpendicular or substantially perpendicular to the moving direction of said photosensitive member. The moving direction of said beam and that of said photosensitive member are respectively called the principal scanning direction and the auxiliary scanning direction. Since the photosensitive member is constantly displaced, the starting point of each scanning stroke with the light beam in the principal scanning direction moves in the auxiliary scanning direction. In such scanning system the quality of the obtained image becomes deteriorated if the beam position relative to the photosensitive member is dislocated from the determined position, namely if the pitch between a scanning line, constituted by the beam trajectory on the photosensitive member, and a succeeding scanning line becomes different from the predetermined pitch.

Such inconvenience has only been avoided by employing a strongly-built structure and by smoothly rotating the photosensitive member with a strong torque. This is due to the fact that, in the case of a resolution of the order of 10 dots/mm, the fluctuation in the scanning pitch can be maintained at less than 100 microns by the use of a firmly built structure in the optical system and in the drive mechanism for the photosensitive member and the deterioration in the image quality is not visually apparent because of the limited number of dots per millimeter.

Such fluctuation in the scanning pitch will however present a problem if a higher speed or a higher resolution is required in such apparatus, since vibration inevitably resulting from the mechanical drive system composed of the drive source, transmission system etc. gives rise to a distortion in the optical system or a slight vibration of the photosensitive member in the displacing direction thereof due to the fluctuation in the rotating torque, thus generating fluctuation of the beam position relative to the photosensitive member. The effect of such fluctuation on the image is not serious if the amount of said fluctuation does not exceed 10% of the designed scanning pitch, but the effect cannot be ignored if said amount becomes comparable to said pitch. Naturally this problem becomes more serious as the apparatus functions at a higher speed, or as the image is formed with a higher density, i.e. with a smaller scanning pitch.

As a numerical example, let us consider a case with a beam diameter of 120 microns and a designed pitch of 83 microns between the scanning lines, corresponding to 12 dots/mm. As the spatial intensity of a beam spot on the photosensitive member follows the Gaussian distribution in the scanning of a constant pitch with a single-mode laser beam, the integrated beam intensity in the auxiliary scanning direction assumes the form shown in FIG. 1, in which the light intensity is represented in a linear scale normalized to the maximum intensity. Also FIG. 2 shows the intensity distribution in case the scanning lines are alternately turned on and off. In order to obtain the highest resolving power on the image, the image-forming process conditions such as the sensitivity, charge, developing bias etc. should be so regulated that the white and black areas are reproduced in the image with the beam exposure shown in FIG. 2. Also in order to obtain a satisfactory image not showing the traces of scanning lines, the above-mentioned process conditions should be so regulated that the beam exposure shown in FIG. 1 provides a solid white or black image respectively in case of a positive-working system in which the exposed area forms a white area or in case of a negative-working system in which the exposed area forms a black area. The ripple in the light intensity becomes larger with the increase in the pitch L of the beam scanning lines. Said distance L can be selected to be larger in the negative working system since the black scanning traces on a white background are visually more unpleasant than white scanning traces on a black background. The above-mentioned objective can be attained for example in the negative-working system by selecting the aforementioned process conditions in such a manner than an area of the photosensitive member exposed with a light intensity exceeding 0.5 is reproduced as black while an area exposed with a light intensity lower than 0.5 or not exposed to the light is reproduced as white. Even when there is a continuous change in density between white and black, a sufficiently high signal-to-noise ratio can be obtained by selecting the intermediate density in the vicinity of 0.5 in the light intensity.

Now, in case the displacement of the beam position in the auxiliary scanning direction on the photosensitive member is influenced by a sinusoidal vibration with a maximum amplitude of 120 microns and a cyclic period equal to 10 scanning cycles, the integrated light intensity shown in FIG. 1 changes to a form represented in FIG. 3. Further it changes to a form shown in FIG. 4 in case the amplitude of the vibration is increased to 600 microns. Similarly the integrated light intensity shown in FIG. 2 changes as shown in FIG. 5 and 6 under the influence of the above-mentioned sinusoidal vibration. Also mutually overlapping plural vibrations provide so-called beat phenomenon.

For example the photosensitive member exposed with an intensity distribution shown in FIG. 3 acquires the surface potential V of a form as shown in the third quadrant of FIG. 7, in which the curve (a) represents a 4-times higher sensitivity than for the curve (b). Stated differently these curves indicate that the situation cannot be improved even with a beam of a 4-times increased intensity.

On the other hand it is extremely difficult to maintain the aberration in the auxiliary scanning direction of the beam position on the photosensitive member within $10\mu$, since the optical system, including the scanning means such as a rotary polygonal mirror, the beam focusing means such as an $f\theta$ lens and eventually a deflecting mirror, must be firmly supported and protected from the vibration during the beam scanning operation.

In a scanning system having a deflecting mirror positioned between an fθ lens and a photosensitive member and at a distance of 200 mm from said photosensitive member, the angular aberration of said mirror must be maintained within 1.7 minutes in order to reduce the error of the beam position in the auxiliary scanning direction to 100μ or less on the photosensitive member. Besides it is not easy to maintain the fluctuation in the rotation of the photosensitive member at 100μ or less in case the photosensitive member is in contact with a heavy load such as a blade cleaner. These causes deteriorate the resolving power of the reproduced image and give rise to irregular beam scanning patterns in said image.

SUMMARY OF THE INVENTION

The object of the present invention is to provide a light-beam scanning image forming apparatus capable of achieving an improved resolving power.

Another object of the present invention is to provide a light-beam scanning image forming apparatus capable of easily forming a high-density image.

Still another object of the present invention is to provide a light-beam scanning image forming apparatus capable of reducing the effect of mechanical vibrations on the reproduced image.

Still other objects and features of the present invention will become apparent from the following description.

DESCRIPTION OF THE PREFERRED EMBODIMENTS

Figure 9:
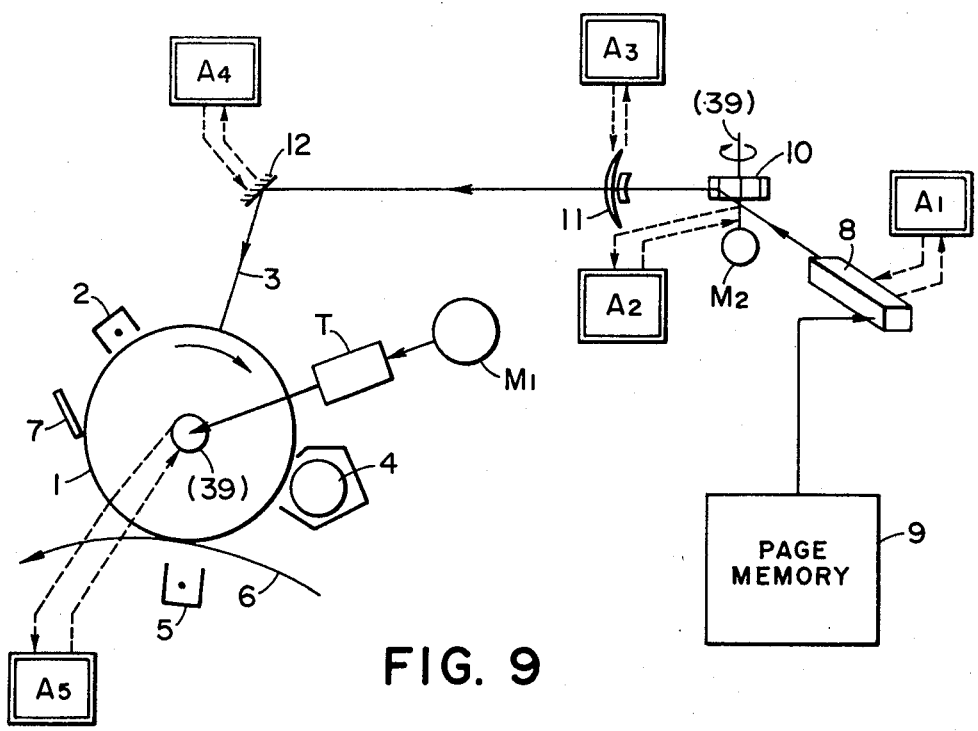
FIG. 9 is a view showing an example of the image forming apparatus.

Referring to FIG. 9, a drum-shaped electrophotographic photosensitive member 1 is rotated in a direction of arrow by a motor M1 through known drive means T such as gears or chain-sprocket mechanisms.

In the course of rotation, the drum 1 is at first subjected to uniform electrostatic charging with a corona charger 2 and is exposed to an infrared, visible or ultraviolet light beam 3 to form an electrostatic image corresponding to the information to be recorded, said image being developed with toner into a visible image at an imaging station 4. The visible toner image thus obtained is transferred onto a copy sheet 6 by means of a transfer corona charger 5, and is fixed on said sheet 6 by means of an unrepresented fixing device. After said image transfer, said drum 1 is cleaned by a blade cleaner 7, maintained in contact with said drum 1, and is used again in the image forming cycle.

A laser beam generating unit 8 generates a laser beam 3 which is intensity modulated in response to the signals from a page memory 9 storing information to be recorded. A polygonal mirror 10 is rotated by a motor M2 to put said laser beam 3 into a scanning motion in a plane perpendicular to the plane of illustration. An fθ lens 11 corrects the beam 3 falling on the drum 1 to a substantially constant speed and focuses said beam 3 onto said drum 1. A fixed mirror 12 is provided to deflect the beam 3 from said lens 11 toward the drum 1.

In the above-explained mechanism, the principal scanning of the beam 3 in a direction substantially parallel to the rotary axis of the drum 1 is achieved by the rotation of said polygonal mirror 10, while the auxiliary scanning, i.e. the relative displacement of the beam 3 with respect to the periphery of the drum 1 in a direction perpendicular to the above-mentioned principal scanning direction, is achieved by the rotation of said drum 1. Thus the scanning pitch, or the distance of beam trajectories, in the auxiliary scanning direction is determined by the number of mirror faces and rotating speed of the polygonal mirror 10 and by the rotating speed of the drum 1. Since the principal scanning speed of the laser beam 3 on the drum 1 is far larger than the rotating speed thereof, the deterioration in the image quality is principally caused by the relative positional aberration between the laser beam and the drum in the auxiliary scanning direction.

Figure 10:
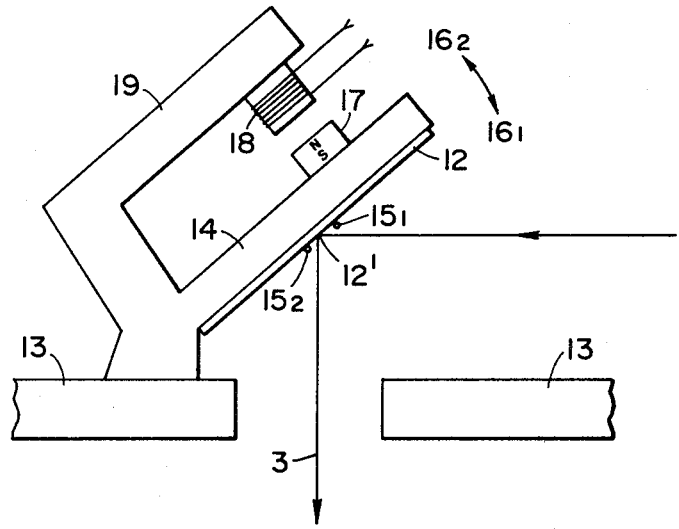
FIG. 10 is a schematic view showing an embodiment of a vibration sensor and compensating vibration forming means.

Now FIG. 10 shows a method of avoiding the vibration in the mirror 12 shown in FIG. 9. A beam 13 constituting a part of the image forming apparatus is provided thereon with a mirror support member 14 on which the mirror 12 is adhered. A sensor 15 (shown in FIGS. 11 and 12) for detecting the mechanical vibration of the mirror 12 is composed of pin diodes $15_1$ and $15_2$ positioned on opposite sides of an incident point $12'$ of the beam 3 onto the mirror 12 in the absence of vibration of said mirror 12, and of a differential amplifier $15_3$ (cf. FIG. 12) to provide electric signals corresponding to the mechanical vibration of the mirror support member 14. In the above-mentioned structure the mirror 12 vibrates integrally with the support member 14.

In this manner said diodes $15_1$ and $15_2$ are so positioned that they do not receive the beam 3 when the mirror 12 is in the normal position but the diode $15_1$ or $15_2$ receives said beam 3 respectively when the mirror 12 is deflected, by the mechanical vibration, in the clockwise direction as shown by the arrow $16_1$ or in the counterclockwise direction as shown by the arrow $16_2$. The signal obtained from the differential amplifier $15_3$ of said sensor is converted into an actuator drive signal by a control device to be explained later. An actuator is composed of a fixed magnet 17 mounted on the mirror support member and a facing solenoid coil 18 which is mounted on a support member 19 integral with the support member 14 and fixed on the aforementioned beam 13. Said solenoid coil 18 receives a vibrating power corresponding to the vibration of the mirror 12 from the control device to be explained later, thus forming a vibrating magnetic field. Thus, in the magnet 17, there is generated a vibrating force resisting the vibration of the mirror 12 resulting from the aforementioned motor or gears, thus cancelling the vibration of said mirror 12.

Figure 11:
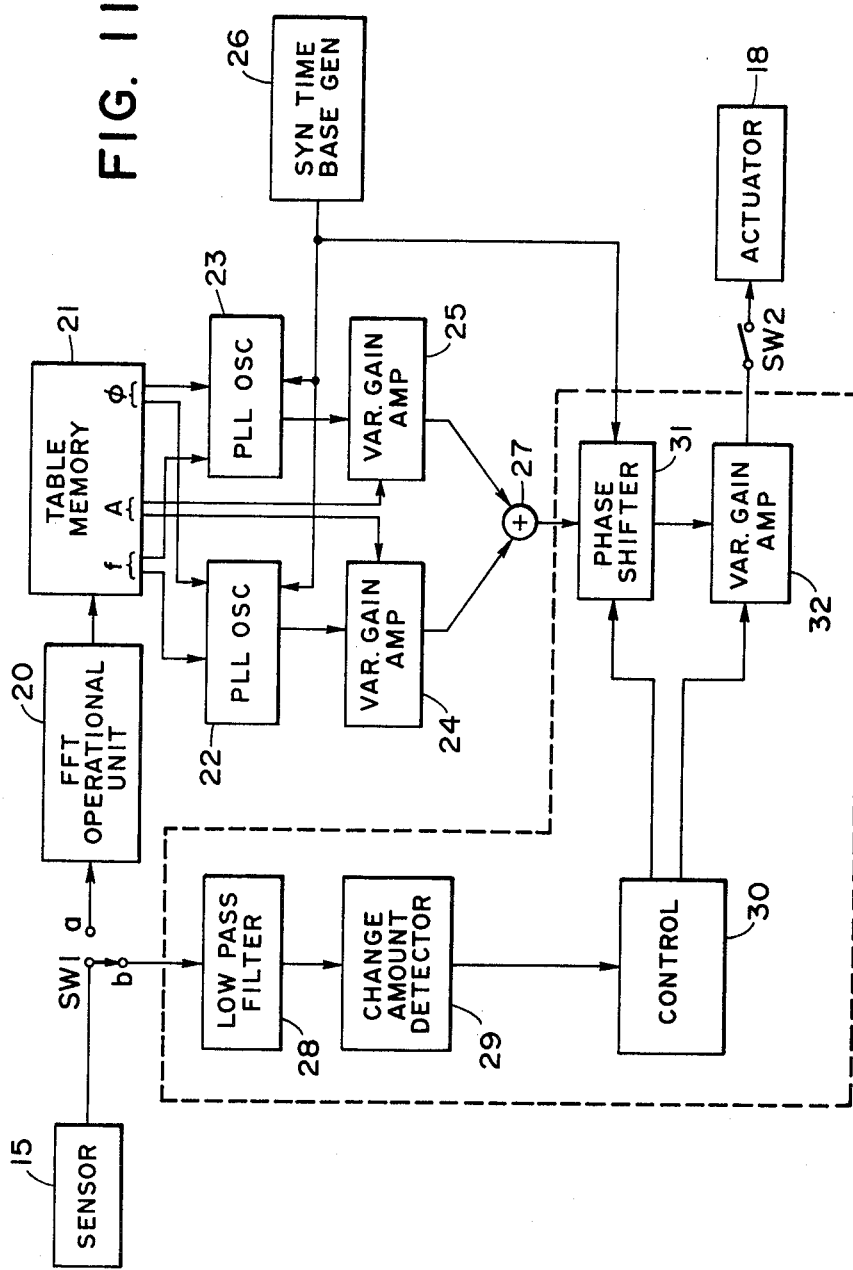
FIG. 11 is a block diagram of an embodiment of the control device.
Figure 12:
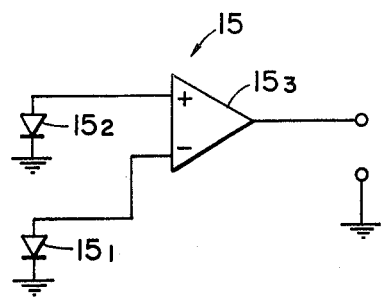
FIG. 12 is a circuit diagram of an embodiment of the vibration sensor.

Now reference is made to FIG. 11 showing an embodiment of the aforementioned control device, which functions in a vibration analyzing mode and a vibration eliminating mode.

In the vibration analyzing mode the device detects the mechanical vibration of the mirror by means of the aforementioned sensor, decomposes said vibration into plural proper vibrations and memorizes the frequency, amplitude and phase difference of said proper vibrations.

Thus a vibration signal corresponding to the vibration of the mirror can be obtained by synthesizing plural signals representing said proper vibrations generated from the thus stored information, and said vibration signal is utilized for driving the aforementioned actuator to provide the mirror with a vibrating force resisting the vibration of the mirror caused by the vibration of the motor or gears. It is however necessary to synchronize said vibration signal with the vibration of the mirror, thus matching the phase of said vibration signal with that of said vibration of the mirror. Also it may be necessary to correct the amplitude of said vibration signal in such a manner that said actuator can be driven with a strength enough for substantially cancelling the vibration of the mirror.

Thus, in the vibration eliminating mode, the device modifies the phase and amplitude of the vibration signal supplied to said actuator in response to the signal from said sensor during the function of said actuator, thus reducing the vibration of the mirror.

More specifically, in said vibration analyzing mode, an electric signal corresponding to the amount of vibration of the mirror 12 is supplied from the sensor 15 to a terminal a through a switch SW1. Said vibration is composed of mutually overlapping plural proper vibrations. Plural periodical signals can be separated by Fourier transformation, and a finite number of data can be processed at a high speed with the already known fast Fourier transformation (FFT) operator, which can determine not only the period of each component but also the phase and amplitude corresponding to said period. Thus, an FFT operator 20 converts the electric signal of the sensor 15 corresponding to the vibration of the mirror into digital signals and stores the period f of each proper vibration and the corresponding phase $\phi$ and amplitude A in a table memory 21, in a descending order of amplitude. FIG. 11 shows a circuit for extracting two proper vibrations, but the number of extractable proper vibrations can be easily increased. In practice, however, it is only necessary to extract several proper vibrations at maximum and to store the period, amplitude and phase of each vibration.

Upon termination of the above-mentioned vibration analyzing mode, the vibration eliminating mode is initiated by changing over the switch SW1 to a terminal b and closing another switch SW2 which remains open during the vibration analyzing mode.

PLL oscillators 22, 23 and variable gain amplifiers 24, 25 are provided for synthesizing signals similar to the aforementioned proper vibrations from the data of period, phase and amplitude stored in said table memory 21. Said PLL oscillators 22, 23 generate sinusoidal waves of determined periods corresponding to the aforementioned data for frequency in the table memory 21, and said sinusoidal waves are phase synchronized by a synchronizing time base generator 26 according to the phase data stored in said table memory 21. Said sinusoidal waves are amplified in the variable gain amplifiers 24, 25 according to the amplitude data in the table memory 21 and are arithmetically added in an adder 27 to provide a synthetic signal similar to the vibration signal supplied from the sensor 15 in the vibration analyzing mode. In this manner the PLL oscillator 22 and the variable gain amplifier 24 generate a first vibration signal having the frequency, amplitude and phase of one of said two proper vibrations, while the PLL oscillator 23 and the variable gain amplifier 25 generate a second vibration signal having the frequency, amplitude and phase of the other of said proper vibrations, and said first and second vibration signals are added in the adder 27 to provide a third vibration signal corresponding to the vibration of the mirror when the actuator 18 is not in function. Said third vibration signal is transmitted to the actuator 18 through a phase shifter 31 and a variable gain amplifier 32 respectively controlling the phase and amplitude of said signal, and further through the switch SW2, whereby said actuator 18 is activated to supply the mirror 12 with the vibration force. Consequently the sensor 15 generates an output signal corresponding to the vibration of said mirror 12 when the actuator is put into motion.

Said output signal is supplied, through the contact b of the switch SW1, to a low-pass filter 28 for eliminating the high-frequency noises, and the relative change in the vibration of the mirror 12 is obtained from a detector 29 for example utilizing diode rectification. A control circuit 30 provided with a microcomputer controls the entire phase and amplitude of the third vibration signal by the phase shifter 31 and the variable gain amplifier 32 in response to said relative change, thus providing the drive signal to the actuator 18. Said control on the phase shifter 31 and the variable gain amplifier 32 can be achieved for example in the following manner. At first the actuator 18 is put into operation with a fixed gain G in the variable gain amplifier 32 and with a zero phase shift p of the phase shifter 31 determined by the synchronizing time base generator 26 to obtain an output signal $V_0$ from the detector 29. Then said actuator is driven with a different shift $P_1$ in said phase shifter to obtain an output $V_1$ from the detector 29. Again the actuator is driven with a phase shift $(0+P_1+P_1)$ to obtain an output $V_2$ from the detector 29. If a relation $V_0 > V_1 < V_2$ is not attained, the above-mentioned procedure is repeated until said relation is attained by taking the output $V_1$ as $V_0$, $V_2$ as $V_1$ and the output of the detector 29 for a phase shift $P+P_1$ as $V_2$. The minimum phase shift providing the minimum vibration of the mirror 12 utilizing the third vibration signal with a fixed amplitude is given by the phase shift P, giving a value $V_2$ satisfying the above-mentioned relation, minus $P_1$. In this manner the phase shift P of the phase shifter 31 is stepwise increased by $P_1$, and an integer n is determined for which the detector output for $P=n \times P_1$ is smaller than that for $P=(n+1) \times P_1$ and that for $P=(n-1) \times P_1$. Thus, in a state where the amplitude of the third vibration signal for driving the actuator 18 is fixed, the vibration of the mirror 12 is minimized at a phase shift $P=n \times P_1$. In this manner the phase of the third vibration signal is determined and transmitted to the phase shifter 31, which supplies the third vibration signal at said phase.

Figure 13:
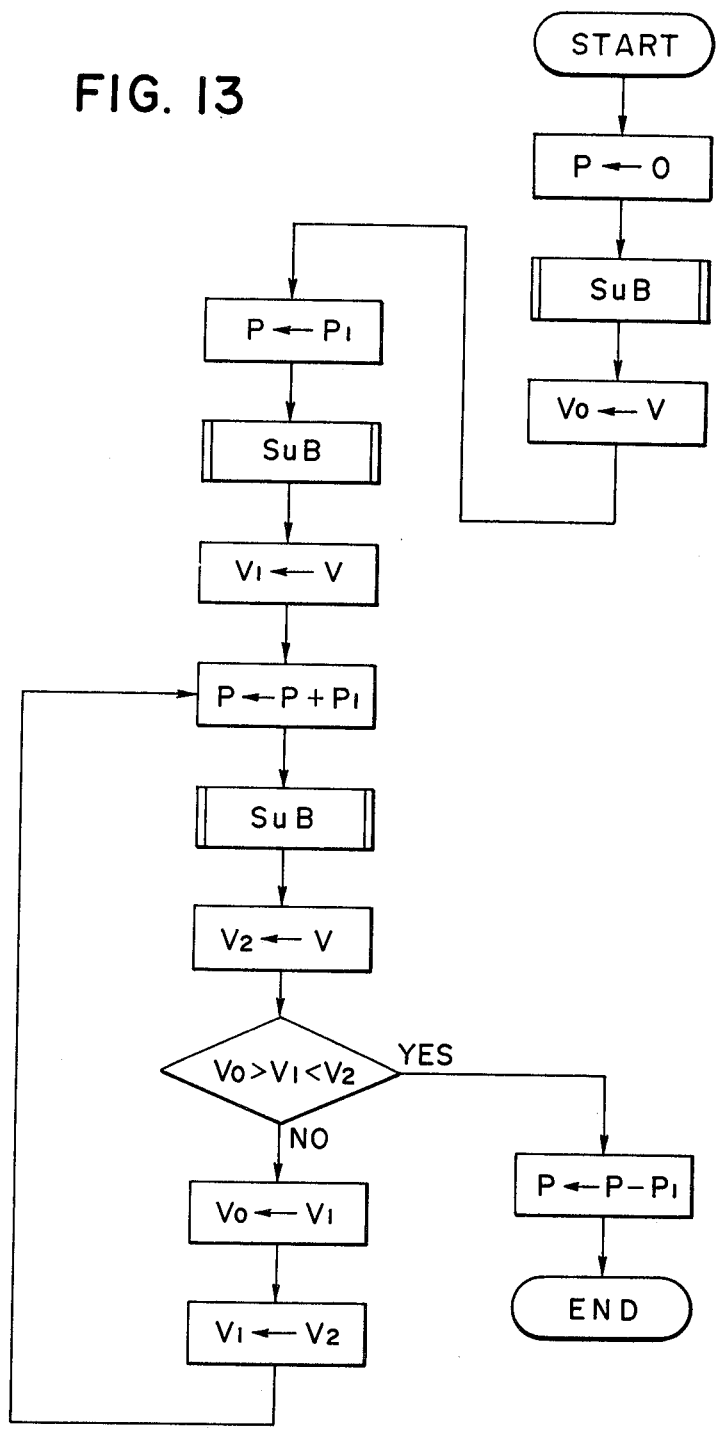
FIG. 13 is a flow chart for the control circuit for executing the vibration eliminating mode.

FIG. 13 shows a flow chart for determining the phase shift by the phase shifter, in which a subroutine SuB instructs a phase shift P to the phase shifter 31 and receives the output signal from the detector 29.

Subsequent to the above-mentioned determination of the phase shift, the gain G of the variable gain amplifier 32 is determined in a similar manner while the phase shifter 31 is fixed at such value of phase shift capable of minimizing the vibration of the mirror 12. In this procedure, the actuator 18 is at first activated with a zero gain in the variable gain amplifier to obtain an output signal $V_0'$ from the detector 29. Then said actuator is put into operation with a gain $G=G_1$ in said amplifier to obtain an output $V_1'$ from said detector 29. Again the actuator is activated with a gain $G=G_1+G_1$ to obtain an output $V_2'$. If a relation $V_0'>V_1'<V_2'$ is not attained, the above-explained procedure is repeated until said relation is attained, by taking $V_1'$ as $V_0'$, $V_2'$ and $V_1'$ and the output of the detector 29 for a gain $G=G+G_1$. The minimum amplitude providing the minimum vibration of the mirror 12 is given the gain G, providing an output $V_2'$ satisfying the above-mentioned relation, minus $G_1$. In this manner the gain G of the variable gain amplifier 32 is stepwise increased by $G_1$, and an integer n is determined for which the detector output for $G=n\times G_1$ is smaller than that for $G=(n+1)\times G_1$ and that for $G=(n-1)\times G_1$. Thus the vibration of the mirror 12 can be minimized by the third vibration signal of an amplitude corresponding to a gain $G=n\times G_1$ in the variable gain amplifier 32. The amplitude of the third vibration signal realizing the minimum mirror vibration is thus detected and transmitted to the variable gain amplifier 32, which supplies said vibration signal, from said phase shifter 31, with the thus determined amplitude.

The flow chart for determining the minimum necessary gain of the variable gain amplifier 32 is obtained by replacing, in the flow chart shown in FIG. 13, P and $P_1$ respectively with G and $G_1$, and V, $V_0$, $V_1$ and $V_2$ respectively with V', $V_0'$, $V_1'$ and $V_2'$. In this case the sub-routine SuB functions to instruct a gain G to the variable gain amplifier and to recieve the output signal from the detector 29.

Figure 7:
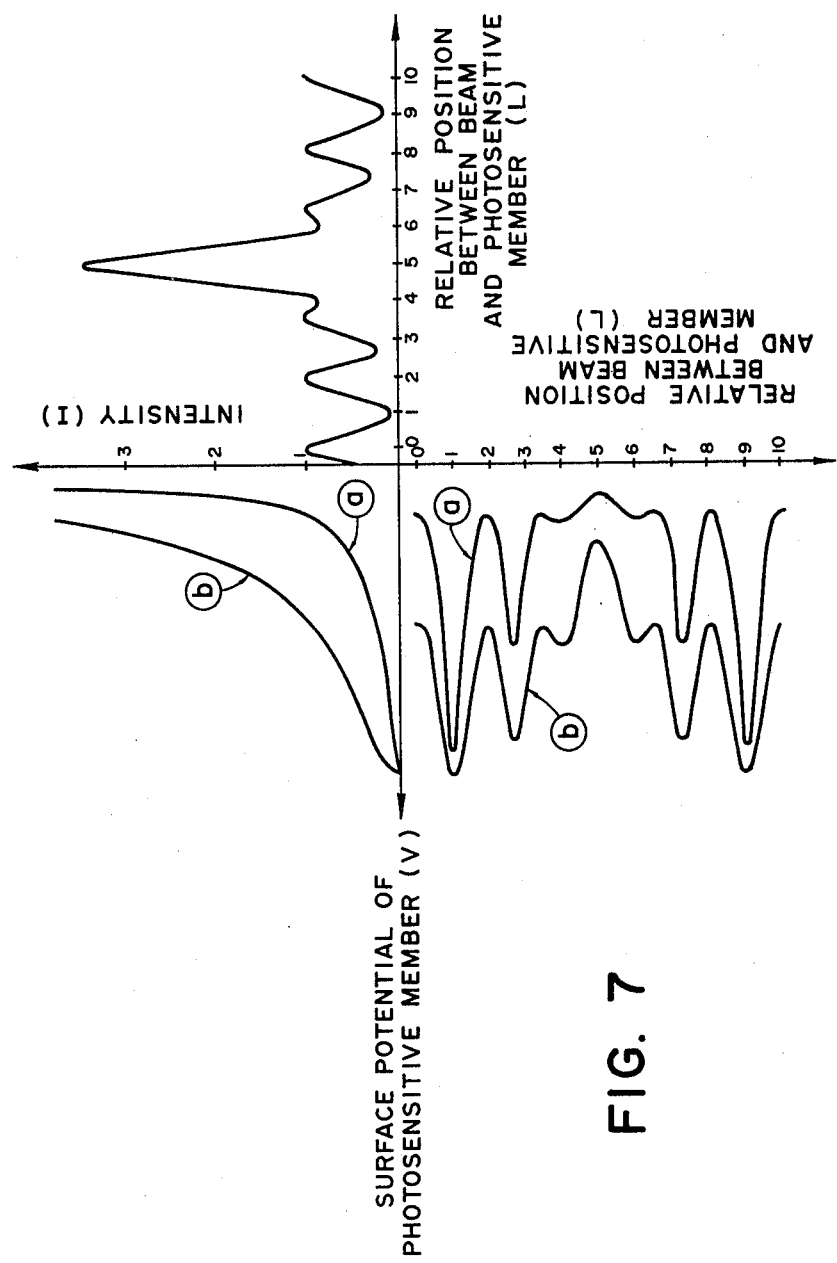
FIG. 7 is a chart showing the surface potential distribution on the photosensitive member corresponding to the beam intensity distribution shown in FIG. 3.
Figure 8:
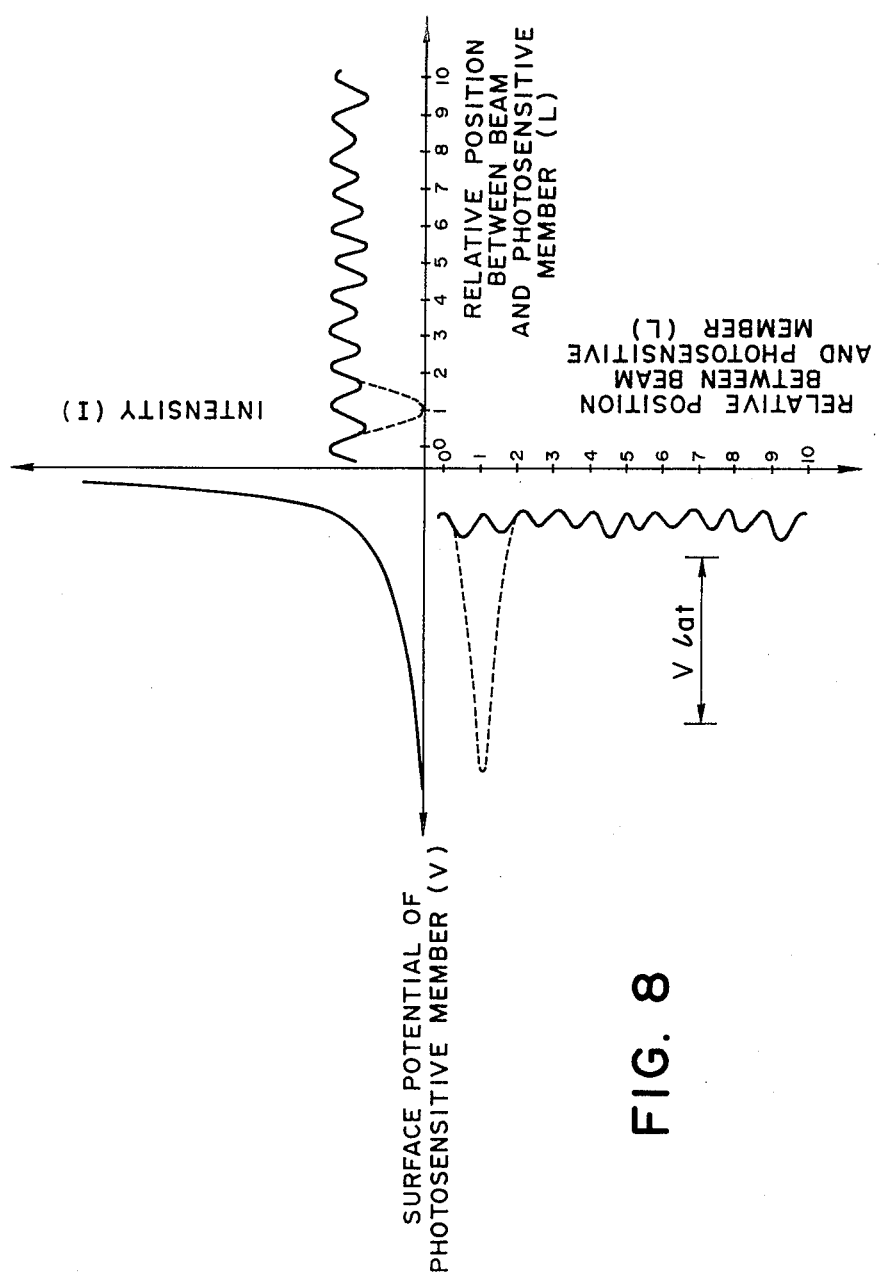
FIG. 8 is a chart showing the effect of an embodiment of the present invention.

In case the amount of vibration of the mirror 12 is reduced approximately to 1/7, the state shown in FIG. 7 is improved as shown in FIG. 8, wherein the latent image has a sufficiently large contrast and the latitude for the threshold of image development is expanded as represented by Vlat. In FIG. 8, broken lines indicate the case where the corresponding beam is turned off.

The above-mentioned vibration analyzing mode and the vibration eliminating mode are preferably conducted after the drum 1 and the polygonal mirror 10 are put into rotation by the motors M1, M2 but before the drum is scanned with the laser beam modulated with the information to be recorded. After the start of said drum scanning, the phase shifter 31 and the variable gain amplifier 32 are controlled according to the phase shift and gain determined in the aforementioned vibration eliminating mode, thus regulating the phase and amplitude of the vibration signal from the adder 27 so as to minimize the vibration of the mirror 12.

Figure 14:
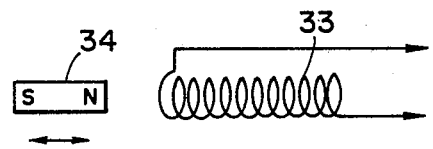
FIGS. 14 and 15 are schematic views showing other embodiments of the vibration sensor.
Figure 15:
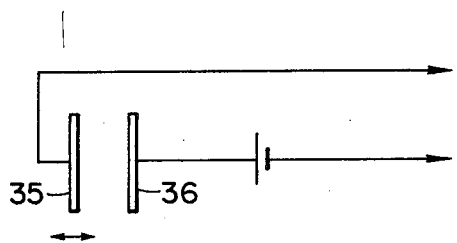
Figure 16:
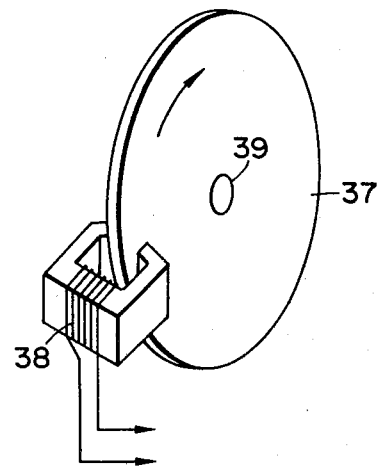
FIG. 16 is a schematic view showing a vibration sensor for a rotary member and compensating vibration forming means resisting the rotary vibration.

The vibration sensor can also be of a structure, as shown in FIG. 14, composed of a fixed coil 33 and a movable magnet 34 mounted on a vibrating member such as the aforementioned mirror support member 14 to detect the current change in said coil, or of a structure, as shown in FIG. 15, composed of a fixed electrode 36 and a movable electrode 35 fixed on a vibrating member wherein the change is detected in the capacity of a condenser constituted by said electrodes. Also in order to detect rotational vibration in the drum 1 or in the polygonal mirror 10, there can be employed a structure composed, as shown in FIG. 16, of a disk-shaped magnet 37 fixed on the rotary shaft 39 of the drum 1 or the polygonal mirror 10 and a coil 38 positioned in facing relationship to said magnet, to detect the change in the current in said coil.

The structure shown in FIG. 10, composed of the magnet 17 and the coil 18, can be employed for providing the fixed optical elements 8, 11 and 12 with the compensating vibrating force. Also the structure shown in FIG. 16 can be employed for compensating the rotational vibration in the drum 1 or in the polygonal mirror 10. More specifically, in order to reduce the rotational vibration in the drum 1 or in the polygonal mirror 10, there are employed two sets of the device shown in FIG. 16, one of which is utilized for detecting the rotational vibration while the other is utilized for generating the compensating vibration. For the latter purpose the disk 37, which can be composed of a magnet or a simple metal plate in this case, is fixed on the shaft 39, and the output signal from the aforementioned variable gain amplifier 32 is supplied to the coil 38. Said rotational vibration is prevented or reduced by the braking force applied to the disk 37.

Figure 1:
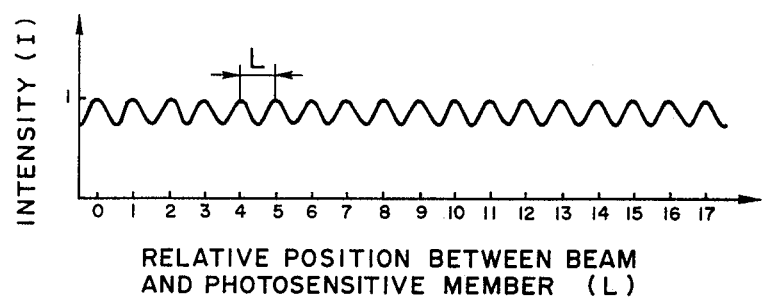
FIGS. 1 and 2 are charts showing the intensity distribution of light beams on a photosensitive member in a vibration-free state.
Figure 2:
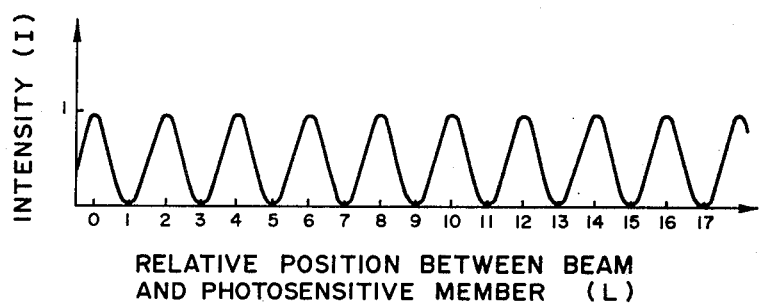
Figure 3:
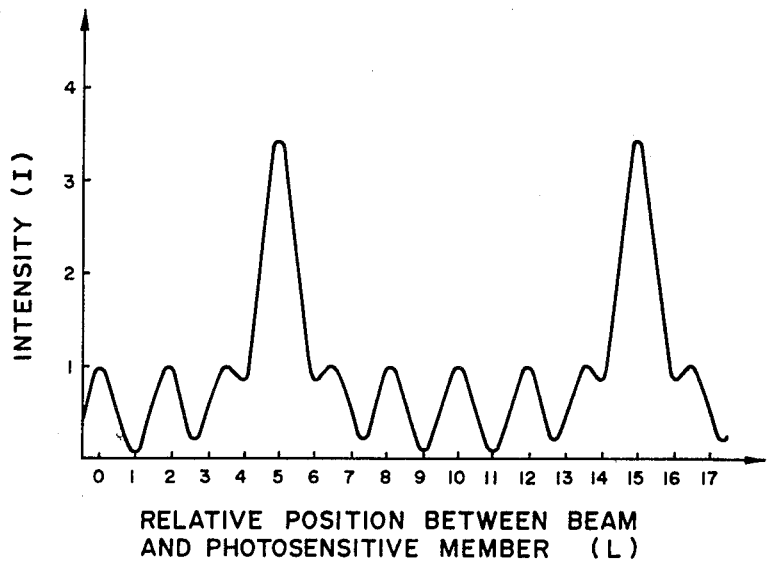
FIGS. 3 to 6 are charts showing the intensity distribution of light beams on a photosensitive member in case the relative beam position on the photosensitive member is influenced by a vibration.
Figure 4:
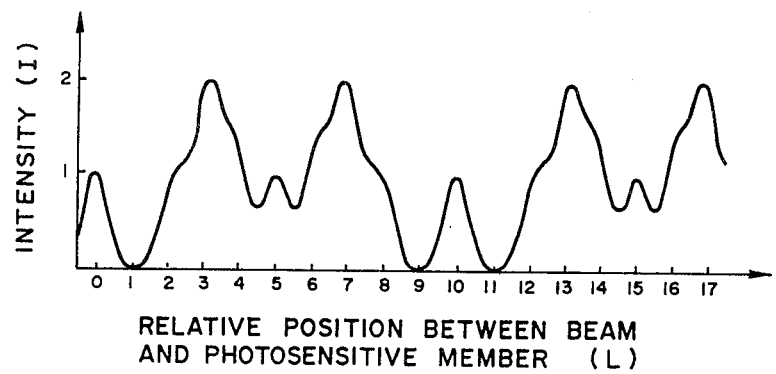
Figure 5:
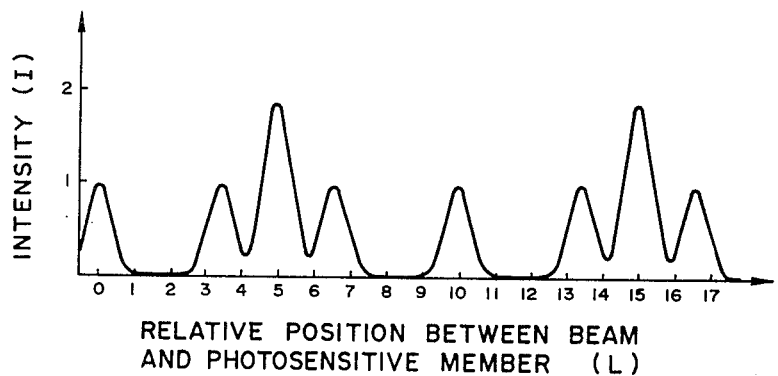
Figure 6:
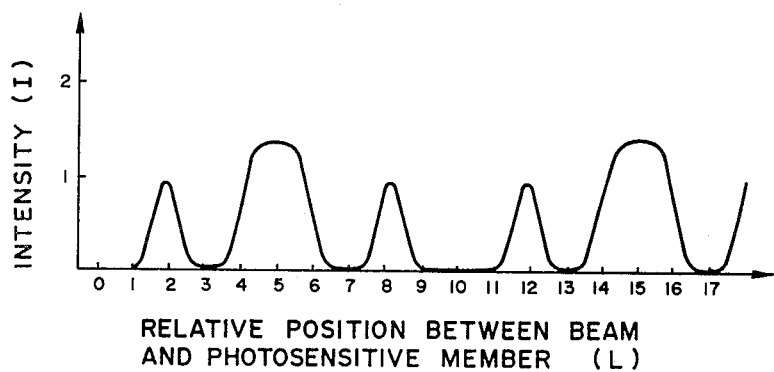

The above-explained vibration reducing device is ideally provided on each of the elements constituting the image forming apparatus, but can be provided, in practice, on at least one of the elements 8, 10, 11 and 12 (A1, A2, A3 and A4 in FIG. 1) or on the drum 1 (A5). Preferably said device is provided on at least one of A1, A2, A3 and A4, and on A5, and more preferably on all said components.

The vibration phenomenon is generally very difficult to analyze, and vibrations which are unpredictable at the designing state may occur due to the materials and shapes adopted for the component parts. The present invention not only solves such problem but is capable of coping with the time-dependent change in vibration for example resulting from wear in gears.

The present invention allows realization of a high-speed image forming apparatus with a high resolving power and with a reduced cost. Also the present invention significantly increases the freedom in the designing since the mechanism of the present invention functions independently from the image forming sequence of the apparatus.

The present invention is furthermore applicable to an image forming apparatus employing a so-called opto-magnetic recording process in which a photosensitive member is heated by a laser beam to a temperature exceeding the Curie point to cause a change in magnetic property, or other image forming apparatus.

What I claim is:

1. An image forming apparatus, comprising:
   a movable photosensitive member;
   optical means including an optical element, for scaanning said photosensitive member with a light beam in a direction crossing the moving direction of said photosensitive member, to form an image corresponding to information to be recorded;
   detecting means for detecting vibration of said optical element of said optical means and for generating an output signal indicative thereof;

vibrating force generating means for generating a mechanical vibrating force which is applied to said optical element; and control means for controlling said vibrating force generating means in response to the output signal from said detecting means in order to reduce fluctuation, in the moving direction of said photosensitive member, of the position of said light beam on said photosensitive member.

2. An image forming apparatus according to the claim 1, wherein said control means comprises:

basic signal generating means for generating a basic signal, in response to the output signal of said detecting means, corresponding to the vibration of said optical element in the absence of the function of said vibrating force generating means; and vibration signal generating means for generating a vibration signal, in response to said basic signal, for driving said vibrating force generating means so as to reduce the vibration of said optical element.

3. An image forming apparatus according to the claim 2, wherein said vibration signal generating means is adapted to modify the phase and amplitude of said vibration signal in response to the output signal of said detecting means.

4. An image-forming apparatus according to one of claims 1, 2 and 3, wherein said optical means at least comprises a laser beam generator, a laser beam scanning member, a lens and a fixed mirror.

5. An image forming apparatus according to claim 2 or 3, wherein said basic signal generating means includes:

means for extracting from the vibration of said optical element plural proper vibration information including the information of frequency, phase and amplitude; and means for forming basic signals by synthesizing said plural proper vibration information.

6. An image forming apparatus, comprising:
a movable photosensitive member;
optical means for scanning said photosensitive member with a light beam in a direction crossing the moving direction of said photosensitive member, to form an image corresponding to information to be recorded;

detecting means for detecting vibration of said photosensitive member and for generating an output signal indicative thereof;

vibrating force generating means for generating a mechanical vibrating force which is applied to said photosensitive member; and control means for controlling said vibrating force generating means in response to the output signal from said detecting means in order to reduce fluctuation, in the moving direction of said photosensitive member, of the position of said light beam on said photosensitive member.

7. An image forming apparatus according to the claim 6, wherein said control means comprises:

basic signal generating means for generating a basic signal, in response to the output signal of said detecting means, corresponding to the vibration of said photosensitive member in the absence of the function of said vibrating force generating means; and vibration signal generating means for generating a vibration signal, in response to said basic signal, for driving said vibrating force generating means so as to reduce the vibration of said photosensitive member.

8. An image forming apparatus according to the claim 7, wherein said vibration signal generating means is adapted to modify the phase and amplitude of said vibration signal in response to the output signal of said detecting means.

9. An image forming apparatus according to one of claims 6, 7 and 8, wherein said optical means at least comprises a laser beam generator, a laser beam scanning member, a lens and a fixed mirror.

10. An image forming apparatus according to claim 7 or 8, wherein said basic signal generating means includes:

means for extracting from the vibration of said photosensitive member plural proper vibration information including the information of frequency, phase and amplitude; and means for forming basic signals by synthesizing said plural proper vibration information.

* * * * *

UNITED STATES PATENT AND TRADEMARK OFFICE
CERTIFICATE OF CORRECTION

PATENT NO. : 4,453,170
DATED : June 5, 1984
INVENTOR(S) : KOZO ARAO

It is certified that error appears in the above-identified patent and that said Letters Patent is hereby corrected as shown below:

Column 4, line 46, change "pin diodes" to --pin photodiodes--.

Signed and Sealed this

Sixth Day of November 1984

[SEAL]

Attest:

GERALD J. MOSSINGHOFF

Attesting Officer

Commissioner of Patents and Trademarks